United States Patent [19]
Skotheim

[11] Patent Number: 4,520,086
[45] Date of Patent: May 28, 1985

[54] RECHARGEABLE SOLID POLYMER ELECTROLYTE BATTERY CELL

[75] Inventor: Terji Skotheim, East Patchoque, N.Y.

[73] Assignee: The United States of America as represented by the United States Department of Energy, Washington, D.C.

[21] Appl. No.: 575,731

[22] Filed: Feb. 1, 1984

Related U.S. Application Data

[60] Division of Ser. No. 386,666, Sep. 6, 1982, Pat. No. 4,442,185, which is a continuation-in-part of Ser. No. 312,888, Oct. 19, 1981, Pat. No. 4,416,959, which is a continuation-in-part of Ser. No. 208,059, Nov. 18, 1980, Pat. No. 4,352,868.

[51] Int. Cl.³ .......................... H01M 6/18; H01M 6/16
[52] U.S. Cl. .................................................... 429/192
[58] Field of Search ............................ 429/30, 33, 192

[56] References Cited

U.S. PATENT DOCUMENTS

| 2,933,547 | 4/1960 | Grubb, Jr. | 429/94 |
| 3,551,211 | 12/1970 | Grulke | 429/192 |
| 4,303,748 | 12/1981 | Armand et al. | 429/192 |
| 4,357,401 | 11/1982 | Andre et al. | 429/192 |

FOREIGN PATENT DOCUMENTS 53-55744  5/1978  Japan ................................. 429/192

Primary Examiner—Aaron Weisstuch

[57] ABSTRACT

A rechargeable battery cell comprising first and second electrodes sandwiching a solid polymer electrolyte comprising a layer of a polymer blend of a highly conductive polymer and a solid polymer electrolyte adjacent said polymer blend and a layer of dry solid polymer electrolyte adjacent said layer of polymer blend and said second electrode.

7 Claims, 14 Drawing Figures

Metal/Polymer/Semiconductor
type-n

Metal/Polymer/Semiconductor
type-P

RECHARGEABLE SOLID POLYMER ELECTROLYTE BATTERY CELL

The United States Government has rights to this invention pursuant to Contract No. DE-AC02-76-CH00016, between the U.S. Department of Energy and Associated Universities, Inc.

This is a division of application Ser. No. 386,666 filed Sept. 6, 1982, now U.S. Pat. No. 4,442,185, which in turn is a continuation-in-part of application Ser. No. 312,888 filed Oct. 19, 1981, now U.S. Pat. No. 4,416,959, which in turn is a continuation-in-part of application Ser. No. 208,059 filed Nov. 18, 1980, now U.S. Pat. No. 4,352,868.

BACKGROUND OF THE INVENTION

1. Field of the Invention

The invention relates generally to photoelectric cells and methods of their manufacture, and more particularly to such cells employing dry, solid thin film polymer electrolytes and methods of their manufacture, as well as polymer films for use in such cells.

2. Description of the Prior Art

Photovoltage or the photovoltaic effect may be defined as the conversion of light or electromagnetic photons to electrical energy by a material. Becquerel in 1839 was the first to discover that a photovoltage developed when light was shining on an electrode in an electrolyte solution. Nearly half a century elapsed before this effect was observed in a solid, namely in selenium. Again, many years passed before successful devices such as the photoelectric exposure meter, were developed. Radiation is absorbed in the neighborhood of a potential barrier, usually a pn junction or a metal-semiconductor contact or junction, giving rise to separate electron hole pairs which create a potential.

Photovoltaic cells have found numerous applications in electronics and aerospace, notably in satellites for instrument power, and powering communications apparatus in remote locations.

Intensive research has been underway in the last decade to improve the production of these cells, e.g., (1) increasing the practical efficiency in order to approach the theoretical efficiency, (2) decreasing production costs, and (3) to find new materials and combinations.

Interest in alternative energy sources and particularly in solar energy has increased because of political and economic impetus. Traditional sources of inexpensive energy are rapidly disappearing. Political instability, price/supply fixing by certain governments, and environmental concerns, dictate the search for new energy sources. Thus the present interest in solar energy. Each country has its own sunlight supply, and the United States has an ample supply. Ecologically, solar cells are a non-polluting clean source of energy. Solar energy in our forseeable future for many generations is limitless and non-depletable. One application of solar energy to which the present invention is directed is the direct conversion of electromagnetic radiation, particularly sunlight, to electricity.

Two of the classical goals of any photovoltaic cell are efficiency, and higher output voltage. Most prior art cells have a theoretical efficiency of 25%. The cells of the present application approach 35%. The prior art voltage ranges from 0.2 to 0.5 volts per cell; the inventor's cells are approximately 0.625 volts.

Further, some prior art cells require that they be oriented so that the incident light is perpendicular to the face of the cell. In the present invention, while this is desirable, it is not essential, and they may operate at an angle from the perpendicular.

In the parent applications of which this forms a continuation-in-part, there is described in one embodiment a photovoltaic cell having a semiconductor layer and an adjacent polymer electrolyte. To improve the electrical properties at the interface, there is included a conductive film between the semiconductor and the adjacent solid polymer electrolyte. One of the objects of the present invention is to provide a conductive film that increases the interfacial contact area and improves the charge transfer characteristics between the semiconductor and polymer electrolyte.

The present invention offers the possibility of ease of manufacture, attendant low cost, and manufacturing of large surface areas with good quality and at a low cost.

The present invention is corrosion free. A reduction oxidation couple in water has a competing photocorrosion reaction resulting from an interaction between the water and semiconductors. The present invention by using a polymer matrix avoids photocorrosion and the attendant problems.

An object of the present invention is to provide novel, double and multiple photoelectric cells for conversion of solar energy to electricity.

Another object of the invention is to provide a method for the manufacture of double photoelectrochemical cells. A further object of the invention is to provide a half-double photoelectrochemical cell for the conversion of solar energy to electricity using a thin film polymer electrolyte, said polymer electrolyte being non-aqueous and solvent free.

A further object of the invention is to provide a new family of photoelectrochemical cells having a theoretical higher output efficiency and output voltage than is available from single cells.

Another object of the invention is to provide cells which are easy to manufacture and are stable in operation.

As noted in the parent applications, there is described a photovoltaic cell in which there is a thin film solid polymer electrolyte with a semiconductor adjacent thereto, and a conductive film between the solid polymer electrolyte and the adjacent semiconductor. An object of the present invention is to provide an improved conductive layer that increases the interfacial contact area and the charge transfer characteristics from the solid polymer electrolyte.

A further object is to provide a film of a polymer blend of a highly conductive polymer and a solid polymer electrolyte, which can be used for electric cells.

A further object of the invention is to provide a method of manufacturing of conductive polymer electrolytes for use in electric cells.

These and other objects and features of the invention will be more fully understood from the description of the embodiments which follow, but it should be understood that the invention is not limited to these embodiments and may find application as would be obvious to a man skilled in the art following the teachings of this application.

SUMMARY OF THE INVENTION

According to one aspect of the invention, there is provided a device having a first layer of semiconductive material having a first band gap; and a second layer of semiconductive material having a different band gap; a layer of dry solid polymer electrolyte between said first and second layers; and a layer of a polymer blend of a highly conductive polymer and a solid polymer electrolyte between said dry solid polymer electrolyte and said semiconductor layer.

According to another aspect of the invention, there is provided a method of manufacturing such cells.

According to an aspect of the invention there is provided a thin film providing improved electric charge transfer across said film having a polymer blend of a highly conductive polymer and a solid polymer electrolyte, said blend being the major component of said film at one face thereof, and said dry solid polymer electrolyte being the major component of said film at another face thereof. Said blend of said conductive and electrolyte polymer is more conductive than said dry solid polymer electrolyte.

According to another aspect of the invention there is provided a method of manufacturing such film and device.

The parent applications describe in at least one embodiment photovoltaic cells having a dry solid polymer electrolyte and adjacent semiconductor layer. This invention, in one aspect, describes an improved contact between said solid polymer electrolyte and semiconductor. This improved contact uses a polymer blend of a highly conductive polymer, e.g. polypyrrole, and a solid polymer electrolyte, e.g. polyethylene oxide complexed with potassium iodide. This blend leads to an increase in the interfacial contact area and an improved charge transfer characteristic between the electrolyte, and the semiconductor. It will be appreciated that there may be additional intermediate layers of conductors such as platinum between the semiconductor and the blend. There is also described a method for manufacturing such a blend and the complete cell.

DESCRIPTION OF THE PREFERRED EMBODIMENTS

Figure 1:
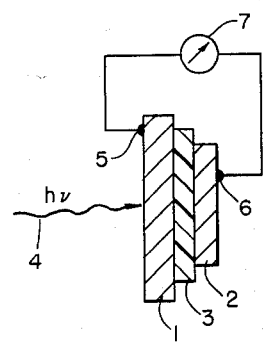
FIG. 1 is a schematic diagram of a double photo-electrochemical cell according to the invention.

In FIG. 1 there is schematically shown the photoelectrical cell having two semiconductors, 1 and 2, separated by a polymer electrolyte 3. Incoming electromagnetic radiation, for example, sunlight, is shown by an arrow 4. Electrodes 5 and 6 are connected to the semiconductors 1 and 2, respectively. The electrodes are connected by leads to a load shown here as a meter 7.

Figure 2:
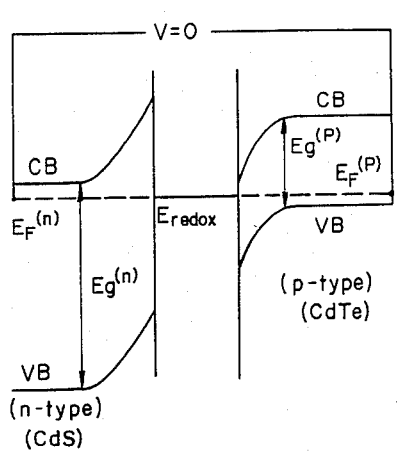
FIGS. 2 and 3 are band diagrams of the semiconductor elements of FIG. 1 when the cell is without incident radiation, and when it receives radiation, respectively.
Figure 3:
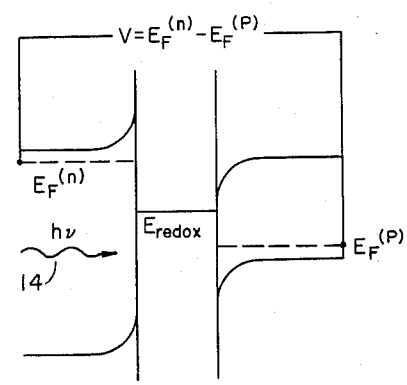

Semiconductor 1 is a thin film of cadmium sulfide, CdS, n-type, and is a thin film, approximately 1 micrometer thick. As shown in FIGS. 2 and 3, the n-type CdS has a wide band gap. Semiconductor 2 is a thin film of cadmium telluride, CdTe, and is doped with a p-type impurity. The n-CdS is undoped and is balanced with more or less Cd or S. It is naturally n-type due to vacancies in the structure of the material and cannot be p-type. The resistivity can be adjusted by the manufacturing process. The CdTe is doped p-type with phosphorous to a concentration of $1.3 \times 10^{16}$ cm$^{-3}$. P-type CdTe has a narrower band gap than that of n-type CdS as shown in FIGS. 2 and 3. The two semiconductors 1 and 2 face each other, and are in contact with and separated by the thin film polymer electrolyte 3.

The polymer electrolyte is an electron and or ion-exchange polymer, for example, a polymer matrix containing a redox or reduction-oxidation couple. The polymer matrix is a polyalkene oxide. Polyethylene oxide has been tried and operates satisfactorily. Polyethylene glycol, polypropylene oxide, or polypropylene glycol also form suitable polymer matrixes. The redox couple is a polysulfide, e.g. polysulfide which has been used by the inventor is $Na_2S_4$. Concentration of $Na_2S_4$ in the electrolyte defined as a weight ratio, 0.25 grams of $Na_2S_4$ for each gram poly(ethylene oxide), or as the ratio of oxygen atoms in the chain to the metal cation, the O/Na$^+$ ratio was 8. Nothing is known at this time about the optimum ratio for maximum conductivity. Other couples may be used. The polymer electrolyte film was made on the CdS 1 by evaporation from a methanol solution, i.e. polyethylene oxide with a methanol solvent. The thickness of the polymer film is about 10 micrometers. Contact with the CdTe semiconductor 2 is by direct physical contacting and heating under vacuum with a pressure of 1 kg/cm$^2$.

Electrical leads shown schematically as 5 and 6 in FIG. 1 are connected to the walls of the semiconductor films 1 and 2. The leads may be any convenient or conventional transparent electrical lead. If the incident light 4 falls on the semiconductor 1, then lead 5 is a grid, or transparent electrode, at least for those portions of the spectrum which are absorbed by the semiconductors 1 and 2. Lead 6 may also be transparent to permit light to enter from both sides of the cell. Alternatively, electrode 6 may be reflective itself or have reflective material on the far side from the light 4, in which case any non-absorbed radiation would be reflected and further absorbed. Electrodes 5 and 6 are connected to leads shown schematically and which in turn are connected to a load, shown here as volt meter 7. A substrate (not shown) is provided as well as suitable mechanical protection for the electrodes and semiconductors. The substrate and protective film must be transparent over that portion of the cell through which light passes. Glass is the usual substrate, although a plastic substrate in an encapsulation material may also be used.

The electrode facing the incident light may have antireflection coating.

FIGS. 2 and 3 are band diagrams of the device of FIG. 1 FIG. 2 shows the device in the dark, and FIG. 3 the band diagram under illumination. The band gap of n-type CdS is typically 2.4 eV. The band gap of p-type CdTe is typically 1.45 eV. At dark, the Fermi level $E_F$ is the same in both materials. Under illumination as shown in FIG. 3 with the incident illumination shown schematically by the wavy line with the legend 14, the Fermi levels shift, and there is a net potential across the semiconductors of $V=E_F(n)-E_F(p)$. The two semiconductors have different band gaps. There is thus a multi-color cell which divides the solar spectrum into two parts, with the short wavelengths absorbed by the wide band gap semiconductor 1, and the long wavelengths absorbed by the narrow band gap semiconductor 2. The polymer electrolyte 3 permits the flow of charge there-across, and the two junctions 1-3 and 2-3 are in series. The maximum theoretical efficiency of the cell is about 35%. This can be compared with the best single junction photovoltaic cell commonly used having a theoretical efficiency of 25%, that being for gallium arsenide. The theoretical efficiency of a cadmium telluride cell by itself is 25%; and that of a cadmium sulfide cell by itself is 16%.

The open circuit voltage measured by meter 7 reads 0.625 volts and a short circuit current of 35 uA/cm$^2$ is obtained using 100 milliwatt/cm$^2$ Xenon light.

Semiconductors of all categories are applicable to the cell of this invention i.e. elemental semiconductors (e.g. silicon, germanium); II-VI; III-V; tertiary compounds (GaAlAs, InCuSe$_2$); layer compounds, transition metal dichalcogenides, (MoS$_2$, WS$_2$, MoSe$_2$, WSe$_2$); organic semiconductors (e.g. 1000 A° phthalocyanines), polymeric semiconductors (e.g. polyacetylene). Single crystal, amorphous, or polycrystalline semiconductors can be used. It is a matter of balancing good semiconductors with the right combination of (a) band gaps, (b) work functions, and (c) electron affinities in order to have the right absorption characteristics and to arrive at good rectifying junctions.

Determination of the resistances or the dopant concentrations at this stage is a matter of optimizing the relative resistances in the cell, i.e. it depends on the resistance of the polymer film, which in turn depends on the polymer used. An average is somewhat higher than the resistances used in traditional photovoltaic cells, e.g. 10-50 ohm-cm.

Figure 4:
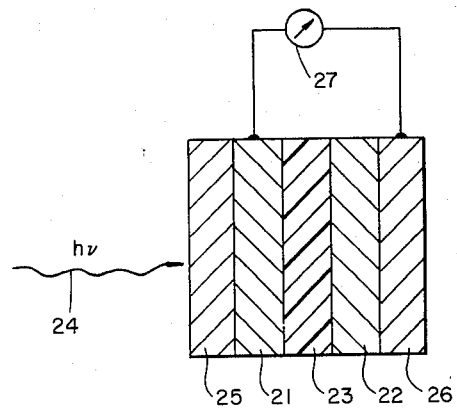
FIG. 4 is a schematic diagram of a second embodiment of the invention showing a half cell.

Turning now to FIG. 4, there is shown an electrolytic Schottky barrier device or "half-cell" of the invention. In this embodiment there is an individual junction. The embodiment of FIG. 4 is similar to the one of FIG. 1 except that one of the semiconductors is replaced by a metal or counter electrode 21. Electrode 21 is a thin metal film or grid which is a semi-transparent or other transparent counter electrode, e.g. tin-oxide or indium-tin-oxide, and is preferably completely transparent to that portion of the spectrum which is to be absorbed. Suitable metals and oxides include Cr, Al, Cr/Cu alloy, Mg, Au, indium-tin-oxide, tin oxide. Layer 22 is either a p-type or an n-type semiconductor, and all semiconductors are applicable. A polymer electrolyte 23 separates the transparent counter electrode 21 and the semiconductor 22. A transparent cover for example, glass 25 or an antireflection coating is on an outside face of the counter electrode 21. A conducting base electrode 26 is on an outside face of the semiconductor 22. Light 24 passes through the transparent cover 25, transparent electrode 21, and electrolyte 23 and is absorbed by the semiconductor 22. The device of FIG. 4 is an electrolytic Schottky barrier cell and may have a higher open circuit voltage than that of the solid state junction cells.

Figure 5:
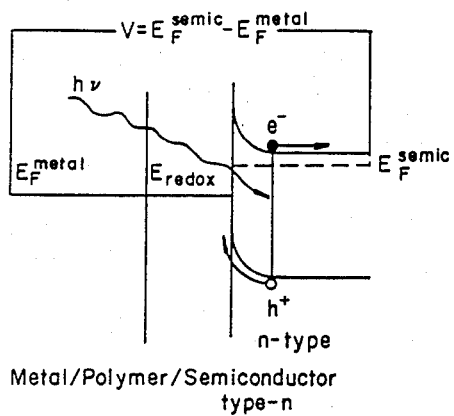
FIGS. 5 and 6 are band diagrams of metal polymer semiconductor devices of FIG. 4.
Figure 6:
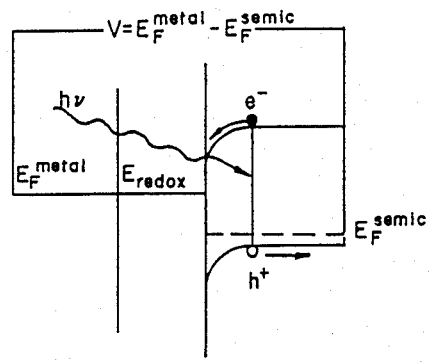

The band diagram of the device of FIG. 4 is shown in FIGS. 5 and 6 with n- and p-type semiconductors, respectively; and with light impinging upon the semiconductors. The flow and direction of holes, h$^+$, and electrons, e$^-$, are shown in the semiconductor region. The voltage across the electrodes 21, 26 at open circuit is $V=E_F^{semi}-E_F^{metal}$ for the n-type semiconductor, and $V=E_F^{metal}-E_F^{semi}$ for the p-type.

The Schottky barrier 'half-cell' may also be a back-wall type cell, i.e. the light is incident on the semiconductor which is a thin film on a transparent conductive substrate. The counter electrode and the polymer in this case do not have to be transparent.

Figure 7:
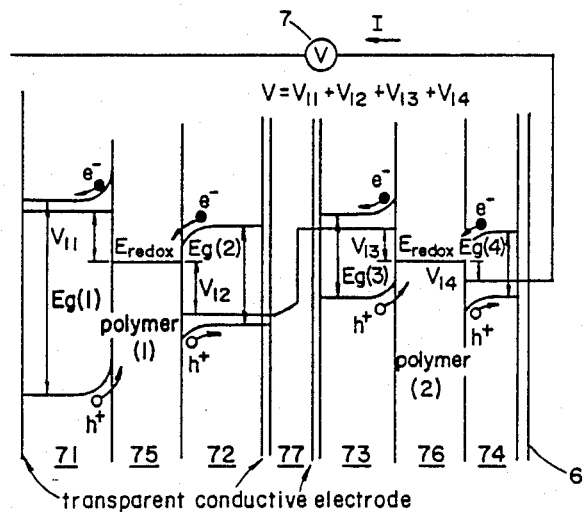
FIG. 7 is a band diagram of further embodiment of a cell having multiple junctions in tandem.
Figure 8:
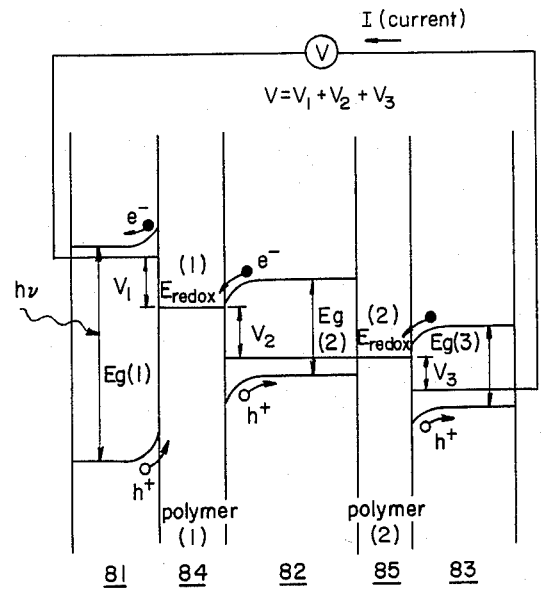
FIG. 8 is a band diagram of an alternative embodiment of a cell having multiple junctions in tandem.

FIGS. 7 and 8 show two further embodiments of cells, both having multiple junctions in tandem. The cells discribed in FIGS. 1, 2 and 3 are stacked in series and include more than two different band gaps. They may be independent cells connected in series with a transparent conductive substrate between the various cells as shown in FIG. 7; or, as shown in FIG. 8, the electrical contact may be made by further polymer films.

In FIG. 7, there are shown four semiconductive thin films 71, 72, 73 and 74. Films 71 and 72 are separated by polymer thin film electrolyte 75; and semiconductors 73 and 74 by electrolyte 76. A transparent conductive electrode 77 is spacer between semiconductors 72 and 73. Electrodes 5 and 6 are connected to the outer face of semiconductors 71 and 74. Electrodes 5 and 77 are transparent conductive electrodes. 77 may be two separate electrodes connected in series. Incident light is shown, by the legend hv, and the wavy arrow, falling upon electrode 5, and passing through the entire cell.

The band gap of the semiconductor 71 is greater than the band gap of the semiconductor 72, which is greater than that of semiconductor 73, and greater than that of 74.

$E_{g(71)} > E_{g(72)} > E_{g(73)} > E_{g(74)}$ with hv incident on 71.

Polymer films 75 and 76 may be identical or different. The order of n and p types may, of course, be interchanged. The electrode 6 does not have to be transparent.

Voltmeter 7 is shown connected to the electrodes 5 and 6, and the voltage measured across that meter 7 is the sum of the potentials $V_{71}$, $V_{72}$, $V_{73}$ and $V_{74}$ developed across or by the semiconductors 71-74. FIG. 7 is not to scale, and electrode 77 is shown in the figure of an exaggerated width in order to show the electrical levels between the semiconductors 72 and 73.

FIG. 8 shows three semiconductive thin films 81, 82 and 83, separated respectively by two polymer thin films 84 and 85. The outer walls of the semiconductors 81 and 83 have a transparent conductive film 5 and a conductive film 6 respectively. The band gap of semiconductor 81 is greater than the band gap of semiconductor 82, which is greater than the band gap of semiconductor 83. Incident light hv impinges the transparent conductive electrode 5 which is connected to the widest band gap or first semiconductor 81 and passes through the array.

$E_{g(81)} > E_{g(82)} > E_{g(83)}$ with light hv incident on 81

As in previous figures there is shown a voltmeter 7, connected to the electrodes 5 and 6, and which measures the potential produced by the three semiconductors so that $V = V_{81} + V_{82} + V_{83}$ Instead of NPP semiconductors the semiconductors may be PNN. The polymer matrix may be the same for polymers 84 and 85, but the molecular or ionic species will be different; one producing a rectifying contact to semiconductor 82, the other an ohmic non-rectifying contact. For example, film 85 makes ohmic contact, i.e. nonblocking contact, to the second semiconductor 82; and a rectifying barrier junction with the third semiconductor 83. Semiconductor 83 has a larger work function than semiconductor 82, if both are p type. The work function is defined as the distance in energy between the vacuum level and the top of the valance band of the semiconductor. If both semiconductors 82 and 83 are n-type, then semiconductor 83 must have a smaller electron affinity than semiconductor 82. The electron affinity is defined as the distance in energy between the vacuum level and the bottom of the conduction band of the semiconductor. Semiconductors 82 and 83 must be of the same type, for the flow of electrons to have the same sense in both semiconductors. Semiconductor 81 and semiconductor 82 are of the opposite type. The semiconductor 81 can be n-type or p type. The band gaps are arranged according to $E_{g(81)}$ is greater than $E_{g(82)}$ which is greater than $E_{g(83)}$, where semiconductor 81 faces the incident light. The three level cell of the type shown in FIG. 8 has a theoretical efficiency of approximately 40%, without concentration of sunlight.

Similarly, the number of cells is not limited to what is shown in FIGS. 7 and 8, but more semiconductors may be added further in tandem to produce multi-color cells of higher order. III-V compounds may be particularly well suited for this type of manipulation of band gaps and electron affinities.

A tandem cell may also be constructed by beginning with a Schottky cell, barrier cell, i.e. by substituting a transparent counter electrode for the first semiconductor cell 71 in FIG. 7 or 81 in FIG. 8, and adding polymer films followed by semiconductors as described above.

The cells described may also be used with systems which concentrate light onto a small area. The advantages of multicolor cells, or tandem cells, are even larger with concentrator systems. The efficiency of the cells is higher, and the added cost of producing the more complex cells may be offset by using cheap concentrator systems, e.g. plastic fresnel lenses.

The higher efficiency is due to the following: As the number of cells increases, the photon flux available for absorption in any one semiconductor in the stack decreases, which leads to a lowering of the photovoltaic conversion efficiency of each junction. The total photon flux incident on the tandem cell stack can be increased by using concentrating mirrors and lenses, thus circumventing this efficiency reduction.

The tandem cell concept is particularly compatible with solar concentrator systems. It should be pointed out, however, that the efficiency of the stack still increases with the number of cells relative to the efficiency of a cell based on a single junction. The production process may lead to inexpensive thin film tandem cells which may make concentrating systems economically unnecessary. The efficiencies which are approximately 25% for 1 cell, 35% for 2 cells, 40% for 3 cells are efficiencies calculated with no concentration, i.e. 1 sun. For a concentration factor of a hundred, i.e. 100 suns, the corresponding numbers are 30%, 42%, and 48%. The numbers vary somewhat depending on the method of calculation but the trend is evident. One reaches a limiting value of about 70% for an infinite number of cells.

An advantage of this invention is the ability to make the cells all thin film, (e.g. the thickness can be a few micrometers or less.) Single crystals may be used as well as amorphous or polycrystalline materials. The thickness of the semiconductor material depends on (a) the absorptivity of the material (how thick to absorb all the light of energy above the band gap), and (b) the diffusion length (if light is absorbed on the opposite side of the junction as in the CdS in the example, the charges will have to diffuse to the junction region on the other side in order to be collected). For silicon, for example, this means a thickness of about 100 micrometers, and for GaAs or CdS, about 2-3 micrometers.

The polymer film will be less than 1 micrometer thick, (even less than 0.1 micrometer) depending on its resistivity and deformability.

Many redox couples can be used, e.g., $I^-_3/I^-$, $TCNQ^-/TCNQ$. These redox species with a single charge can be transported as ions through the polymer. Ions with multiple charges may interact too strongly with the matrix to have ionic mobility but at high concentrations may provide electronic conductivity by hopping or tunneling between the molecules. In this case, applicable multiple charged redox species include e.g. $Fe^{2+}/Fe^{3+}$, $Fe(CN)^{3-}_6/Fe(CN)^{4-}_6$, Quinone ($Q/QH_2$), and others.

Polymers to be used can be grouped in five catagories.

(i) For solution produced films, insulating polymers with high dielectric constants and therefore high solubility for ions are applicable for the production process described. Polymers with sulfonic groups are good, i.e. sulfonic polymers.

(ii) Electronically conductive polymer films with ions dissolved in the polymers, e.g. polyacetylene. The combination of electronic and ionic conductivity imparts higher mobility to the ionic species in order to preserve space charge neutrality in the film. There is at the moment ongoing research with the aim of using polyacetylene for ion transport. This is essentially a new use of a new class of polymers.

(iii) Poly(phenylene oxide) incorporating ferrocene. These films are produced by electrochemical oxidation on metal surfaces. They may be produced on the transparent counter electrode. Then the semiconductor material is placed on top of the polymer, n- or p-type. Alternatively, the doped polymer may be produced directly on the surface of an n-type material by the process of photo-electro-oxidation by illuminating with light having energy higher than the band gap of the semiconductor. An anodic (positive) polarization is applied to the semiconductor in order to drive the minority carriers (holes) to the semiconductor/electrolyte interface to perform the oxidation of the monomer in solution to polymer, which deposits onto the semiconductor surface. The polymer itself is insulating. Molecules can be incorporated into the polymer matrix from the same solution. The resulting polymer film is uniformly doped with molecules or ions and therefore forms a rectifying barrier with a semiconductor. This process is applicable to other insulating polymer matrices than poly(phenylene oxide) and to other dopants than ferrocene. An example of this process for a different type of polymer, is the electronically highly conductive polymer of polypyrrole.

An equivalent process is photo-electroreduction on the surface of p-type semiconductors. The absorbed light of energy larger than the band gap of the semiconductor produces electron-hole pairs. Cathodic(negative) polarization on the semiconductor makes the minority carriers (electrons) flow to the semiconductor/electrolyte interface and can be used to reduce monomers in solution to polymers on the surface incorporating dopant molecules or ions from the solution. The process is thus a one-step oxidation or reduction and doping. An example of this process is the electrochemical reduction of acrylonitrile to polyacrylonitrile.

The polymers which can be photoelectropolymerized on n-type semiconductors in the manner described above can be polymerised on p-type semiconductors as well by anodic polarization without light. Similarly, the polymers which can be photoreduced on p-type semiconductors can be reduced directly by a negative voltage on the surfaces of n-type semiconductors.

(iv) Polymers with pendant groups attached to the backbone of insulating polymers, e.g. TTF substituted polystyrene copolymer. The energy levels which interact with the semiconductor to produce a junction are defined by the pendant molecules which, in high concentrations, produce electronic conductivity by hopping or tunneling. These energy levels can be adjusted by substituting different pendant groups.

(v) Various polymer production techniques may be used, including (i) Solvent evaporation:(spin-coating is used to produce thin uniform films. This has been used with pendant group polymers and with poly(ethylene oxide). (ii) Glow discharge polymerization. (iii) Oligomerization during surface chemical reaction. (iv) (Irreversible) adsorption of polymer films. (v) Plasma polymerization. (vi) Electrodeposition, and (vii) Functionalization of surface bound polymers. Several techniques may be combined either at the same junction or at successive junctions. Poly(ethylene oxide), for example is soft and a very thin coating may not have the rigidity required for assembly. A very thin layer of a more highly conductive polymer is photoelectro-polymerized on a face of one or both of the semiconductors and a soft material e.g. poly(ethylene oxide) is between the two.

Techniques for producing semiconductor thin films include these techniques for making the semiconductor film directly on top of the polymer film, which has been made on a transparent electrode or the opposite semiconductor. They include (i) Spray pyrolysis (solution spraying). This requires substrates held at elevated temperatures, sometimes up to 400° C., and requires polymers which can withstand such high temperatures. (ii) Silk screening (seriographic) techniques. (iii) Deposition from aqueous solution. Solution of ions precipitate as semiconductor films on top of the substrate. This has been demonstrated for a number of II-VI compounds, e.g. CdS, CdO, ZnO, and is not a high temperature process. (iv) Cathodic codeposition of different elements using the polymer coated electrode as cathode. This has been demonstrated for CdSe (without polymers on the electrodes). It involves an aqueous solution and is therefore not a high temperature process. (v) Anodic formation of semiconducting films by using the polymer coated electrode as an anode in aqueous solution. This has been demonstrated for CdS and $Bi_2s_3$. This is not a high temperature process.

Figure 9:
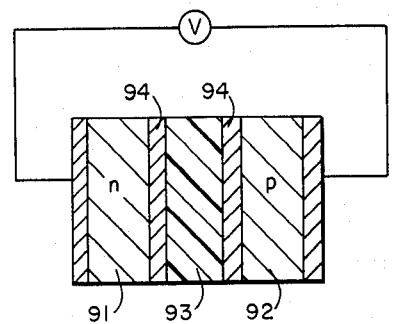
FIG. 9 is a schematic diagram of a further alternative embodiment of the invention.

FIG. 9 shows an alternative embodiment of the cell of this invention. Two semiconductor films 91 and 92, for example, n and p type respectively, are separated by a thin film electrolyte 93, e.g., a polyethylene oxide redox couple. On one, or both sides of the film 93, there is a highly conductive polymer 94. In FIG. 9, the highly conductive polymer 94 is shown on both sides, however, it need not be on both. The film 94 is a highly conductive polypyrrole doped with a suitable transport ion, for example, $BF^-_4$ or $ClO^-_4$. Other films include polyphenylene-oxide doped with ferrocene; or polyphenylene sulfide doped with ferrocene. Alternatively, the films 94 may be a thin film metallic layer, for example, gold, silver, or platinum. In the case of the highly conductive polymer, the film is several hundred angstroms thick. If the film is metallic, it is a few angstroms to a few hundred angstroms thick. The conductive polymer film 94 on either side of the film 93 may be the same or of different types. The film 94 has a work function such as to make a rectifying energy barrier within the semiconductor. Of course, the thin films 93 and 94 must be transparent, and that controls the maximum thickness.

One may view the embodiment of FIG. 9 as at least one semiconductor with a highly conductive film 94, adjacent to which and together with is the film 93 and the other half of the tandem or multiple cell.

In all the cells of all the figures the polymer electrolyte is not limited to ion conductors, but any polymeric conductor is suitable, so long as it be capable of conducting electricity and is not limited to the ionic ones. This is sometimes termed any solid polymer electrolyte.

In FIG. 9 it should be noted that the Fermi level in the band diagram of the layers 93 and 94 is constant and does not shift in both the dark and under illumination. Of course the Fermi levels in the two semiconductors 91 and 92 do shift during illumination, and this of course produces the voltage across the cell.

An example can be given of the formation of highly conducting polypyrrole on the surface of n type silicon. The method is applicable to other combinations of polypyrrole and polymers on semiconductor materials.

Pyrrole can be polymerized onto the surface of metal electrodes and doped to a conductive form by a one-step electrolytic oxidation of pyrrole in acetonitrile solution using a tetraethylammonium tetrafluoroborate electrolyte. Dark electrolytic oxidation on an n-type semiconductor is impossible because the oxidation potential of pyrrole lies at a higher positive potential than the flat band potential or the conduction band edge of the known semiconductors. The oxidation of pyrrole to polypyrrole on an n-type semiconductor surface is carried out by illuminating the semiconductor with light of an energy higher than the band gap and applying a small anodic bias. The minority carriers generated by the light absorption migrate to the semiconductor-electrolyte interface where they oxidize the pyrrole which in turn deposits onto the surface as polypyrrole. The polymer is uniformly doped by anions from the electrolyte to a highly conductive form or a p-type semiconductor depending on the solution concentration of the dopant. It is produced on single crystal, polycrystalline, or amorphous semiconductors.

Figure 10:
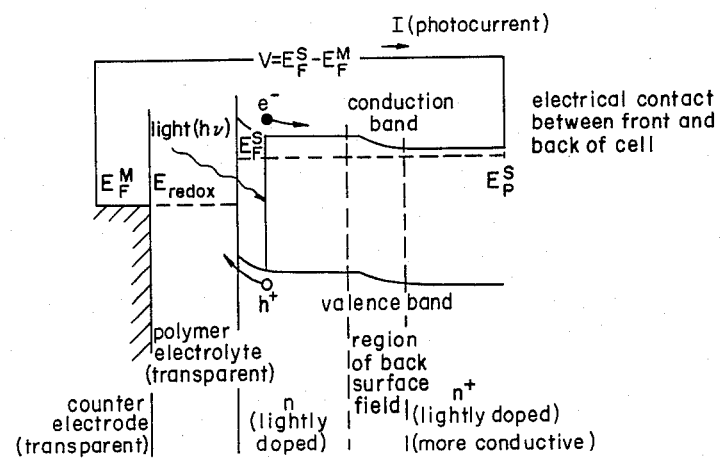
FIG. 10 is a band diagram of a modified cell.

FIG. 10 is a band diagram, (Similar to FIG. 5) of a modification of the cell of FIG. 4, to improve the rectifying junction between semiconductor and electrolyte.

The doping in the semiconductor is varied in order to produce a semiconductor surface layer of higher resistivity than the polymer electrolyte. An n-type semiconductor would have the designation n/n+ which denotes a layered structure of a lightly doped film (n) on top of a more heavily doped substrate (n+) of the same material. Examples of lightly doped are $10^2$–$10^6$ ohm-cm and heavily doped 0.01–10 ohm-cm. The thickness of the lightly doped layer is as thick as a few micrometers (2–3 $\mu$m) or as thin as 1000 Angstroms. This structure also provides a back surface field to help in the separation of the charges.

In FIG. 10, the electric fields are represented as slopes of the energy bands of the semiconductor. The back surface field has the same direction as the field at the interface, and thus aids in the charge separation for that part of the light which is absorbed further into the semiconductor.

For p-type semiconductors the structure would be p/p+, exactly equivalent.

The resistive surface layer may be made epitaxially on the more conductive substrate. If the semiconductor is a film (e.g. made by evaporation or sputtering), the dopant concentration may be varied by varying the rate of evaporation from the dopant source. If the semiconductor is made by electrolytic deposition, the dopant concentration can be varied by changing the dopant concentration in the electrolyte.

The counter electrode is transparent and can be a thin metal film on glass (e.g. Au, Pt, Pd, Co) 50–150 Angstroms thick, a conductive oxide (e.g. indium-tin-oxide or tin-oxide), or a conductive oxide with a very thin metal film to enhance the charge transfer capabilities (e.g. 5–100 A of Pt, Pd, Au, Co).

This structure has a higher resistivity in the semiconductor surface layer than in the electrolyte. Thus the built-in voltage across the junction falls across the semiconductor rather than the electrolyte. This electric field across the surface layer of the semiconductor is necessary for efficient separation of the photogenerated charges.

Figure 11:
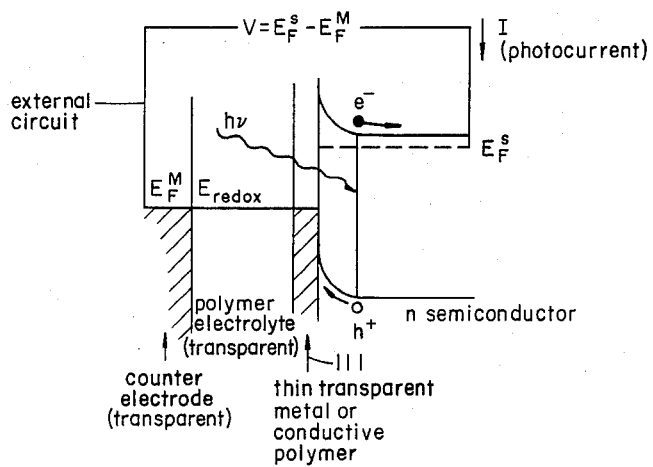
FIG. 11 is a band diagram similar to FIG. 10, showing a further modification.

FIG. 11 is a band diagram (similar to FIG. 10) of a further modification of the cell of FIG. 9.

A rectifying junction is made by depositing a transparent, highly conductive film 111 on the surface of the semiconductor. The film can be a highly conductive polymer (e.g. polypyrrole) or a metal (e.g. Pt, Au). For an n-type semiconductor substrate the material must have a high work function (electronegativity) and for a p-type semiconductor the material must have a low work function (electronegativity) in order to make a rectifying junction with the semiconductor. The thickness of the polymer is typically 100–1000 A and for the metal 5–150 A.

The n/n+ structure of FIG. 10 may be employed in addition to the surface modification. The situation for a p-type semiconductor is exactly equivalent.

It is advantageous to modify the surface with a very thin film of metal (e.g. Pt) of 2–3A to 50A thickness before depositing the polymer, especially when using n type Si with polypyrrole deposited from aqueous electrolyte.

The double cell of FIG. 1 may include the modification of FIGS. 10 and 11. In FIG. 1, the (modified) semiconductor replaces the counter electrode, the second semiconductor will be of different band gap than the original and of opposite type, light being incident on the back side of the wide band gap semiconductor which has a transparent ohmic (non-rectifying) contact. Similarly, the modifications of FIGS. 10 and 11 may be applied to the cells of FIGS. 7 and 8.

Figure 12:
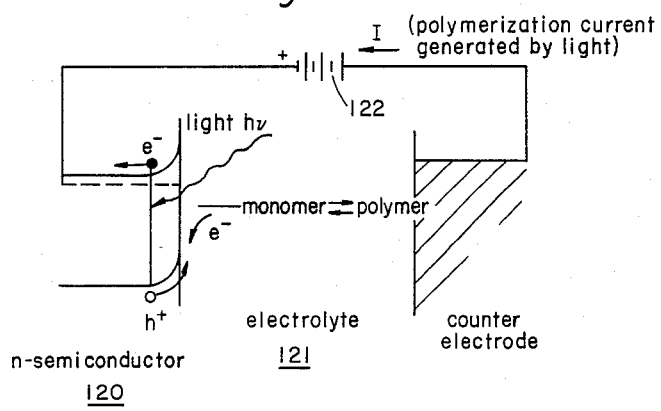
FIG. 12 is a diagram illustrating a method of manufacturing highly conductive and transparent polymer films of the cells.

FIG. 12 is a diagram illustrating method of manufacturing highly conductive and transparent polymer films; for example the photoelectrochemical generation of thin conductive polymer films (e.g. polypyrrole) on n-type semiconductor (e.g. n-Si) using light absorbed by the semiconductor.

A semiconductor 120 is immersed in a solution 121 which contains the monomer (the building blocks of the polymer chain) and a supporting electrolyte which contains the species to be used as dopant for the polymer. The light is absorbed by the semiconductor, and generates electron-hole pairs (h+, e+). A positive potential from a source 122 on the semiconductor drives the holes to the semiconductor-electrolyte interface. The hole reaching the interface takes an electron from (oxidizes) a monomer in the solution. A polymer film wil then grow by this electro-oxidation process on the surface of the substrate. Electro-oxidation has been known on metal surfaces (where light is not needed) for a number of different polymers (see list at the end of this section). The process is used for polypyrrole, polyaniline and polythienylene on semiconductors. Exactly how the process occurs on the molecular level is not yet known.

The monomer concentration (e.g. pyrrole) is typically 0.01 Molar to 1.0 M, the supporting electrolyte contains the ions to be used as dopants (e.g. $BF^-_4$, $ClO^-_4$, $I^-$, $Br^-$, $Cl^-$) typically in concentrations 0.01–1.0 M. The dopant molecules (e.g. $BF^-_4$) will be included in the film as it is being made. The dopants will be acceptors (of electrons).

The doping may also be done from the gas phase of the dopant. It may also be done electrochemically after the film is made.

The solvent is an organic solvent (e.g. acetonitrile, dimethylformamide, dimethylsulfoxide, propylene carbonate, methanol) or water. It may also be a mixture (e.g. acetonitrile+pyridine).

The doping and the manufacturing of the polymer films may thus be a one-step process. The polymer films will continue to grow only as long as the light is on and the film is not yet thick enough to absorb all the incident light. Thick films become black and non-transparent because they are highly conductive.

A negative potential on an illuminated p-type electrode drives the photogenerated electrons to the interface where they reduce (add an electron to) a monomer species in solution which then builds a polymer film on the surface of the semiconductor. The dopant in this case will be an electron donor (e.g. Na, K).

Several films can be made in the same manner:
Polyaniline

The monomer is aniline, the concentrations and the solvents and the procedures are the same.

Substituted Anilines.

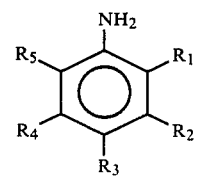

$R_1$–$R_5$ each are a member of the following chemical groups: para-$CH_3$, para-$OCH_3$, ortho-$CF_3$, meta-$CF_3$, para-COOH, ortho-$NH_2$, para-$NH_2$.

Other substituents are also applicable. e.g. p-toluidine, p-anisidine, 2-aminobenzotorifluoride, 3-aminobenzotrifluoride, p-aminobenzoic acid, p-phenylenediamine, and o-phenylenediamine. In the case of aniline, the parent compound, all the $R_1$–$R_5$ are H, hydrogen.

Polyphenylene oxide (PPO)

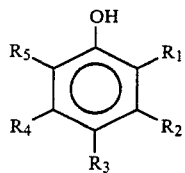

$R_1$–$R_5$ can be hydrogen or substituent groups. Dubois et al. have studied alcohol substituents, alkyl radical substituents, hydroxy-or carboxymethylated groups (ref. 4).

The medium is e.g. Methanol—0.15 Molar NaOH containing 0.2 Molar concentration of the monomer to be polymerized. In principle the same solvents and concentrations as well as the dopants used with the anilines and pyrrole are applicable. There is higher electrical conductivity when the ferrocene is in the solution.

Poly(2,5-thienylene) (or polythiophene)

The monomer is thiophene which can be polymerized photoelectrochemically.

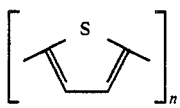

New candidates:
Poly(p-phenylene)

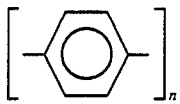

Poly(p-phenylene sulfide)

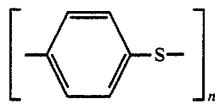

Poly(dibenzothiophene sulfide)

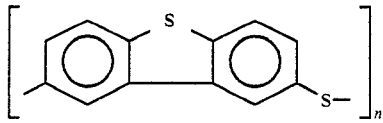

Poly(hydroxyphenylene)

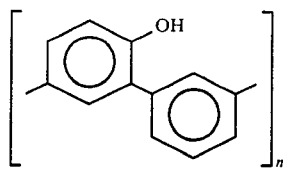

Certain polymer films can be made by condensation from the gas phase, e.g. $(SN)_x$ or polysulfurnitride, where the $(SN)_x$ source is held at 135–150 degrees centigrade and the surface to be polymerized at 15°–20° C.

Other polymer films can be made by gas phase ionization or plasma polymerization, by an electric discharge in a gas of the monomer.

The thin transparent metal films are made as follows: If the semiconductor surface is modified by a metal film the film can be made by deposition in vacuum (thermal evaporation or sputtering) or electrolytically from a solution containing ions of the metal to be deposited. The thickness of the metal film can be from 2–3 Angströms to 150 Angströms. The metals traditionally used have been Pt, Pd, Au, Mg, Cr, Al, Cs, Cr-Cu alloys. Metal oxides which have been used include indium-tin oxide and tin indium-tin oxide, tin oxide.

The polymer electrolyte used is an electron or ion exchange polymer, e.g., a polymer matrix containing a redox reduction-oxidation couple, and includes:

1. Polyethers: polyethylene oxide and polypropylene oxide.

The films are cast from solutions containing dissolved redox couples, e.g., iodine ($I^-_3/I^-$), bromine ($Br^-_3/Br^-$), tetracyanoquinodimethane ($TCNQ^-/TCNQ$), and polysulfides (e.g, all of which) are good candidates for ion exchange couples.

More speculative are iron ($Fe^{2+/3+}$), ferricyanide ($Fe(CN)_6^{3-/4-}$), and Quinone ($Q/QH_2$). These are multiply charged and may not transport through the matrix. However, at high concentrations they may conduct via electron hopping.

2. Polyurethanes made from polyethylene glycol and polypropylene glycol.
3. Polyacetylene.
4. Polyhydroxyphenylene which conducts via electrons and ions and falls in the same category as polyacetylene.
5. Polymers with electroactive groups attached to the polymer backbone, e.g. phenoxytetrathiafulvalene. Tetrathiafulvalene (TTF) groups are attached to the polystyrene backbone. This polymer is a very good medium for transporting ions. Polystyrene itself is an insulator. Attaching other groups than TTF changes the charge transfer properties and allows for possibly optimising the ion exchange polymer, i.e. different groups corresponding to different redox energy levels, which in turn are matched with the semiconductor energy levels.
6. Polysulfone. This is a substitute for the polyethers.
7. Cellulose acetate.
8. Poly(gamma 8-methyl L-Glutamate).

Semiconductors of all categories are applicable to the cells:

1. Elemental semiconductors: Si, Ge
2. II-VI compound semiconductors (from the columns II and VI in the periodic table): Cadmium sulfide (CdS), Cadmium Telluride (CdTe), CdSe, ZnSe, ZnTe.
3. III-V compounds: GaAs, GaP, InP, AlAs, AlP.
4. III-V ternary alloys: GaAlAs.
5. Tertiary compounds: $CuInS_2$, $CuInSe_2$.
6. Transition metal chalcogenides: $WS_2$, $WSe_2$, $WTe_2$, $MoS_2$, $MoSe_2$, $MoTe_2$, $ZrS_2$, $ZrSe_2$, etc.
7. Other inorganic semiconductors: $Bi_2S_3$, $Zn_3P_2$, CuO, $CuS_2$.
8. Organic semiconductors: anthracene, tetracene, pentacene, etc.
9. Pigment films: Cyanines, phthalocyanines, hydroxysquarylium etc.
10. Polymeric semiconductors, e.g., polyacetylene, polyacrylonitrile.

Single crystals, polycrystalline, and amorphous films, in particular amorphous Si, are all applicable. Dopant concentrations will be optimized for each particular interface.

Thus, there has been shown and described several novel photovoltaic cells using solid polymer electrolytes. Polymer electrolytes are a new concept in photoelectrochemical cells for the conversion of solar energy to electricity. It is envisioned that this is a basic invention of such devices and the invention should not be narrowly interpreted during the life of any patent. Those following the teachings of this application will no doubt be led to other and additional polymer electrolytes and other semiconductors than those specifically described herein (which are the ones that have been employed by the inventor in his research to date).

Figure 13:
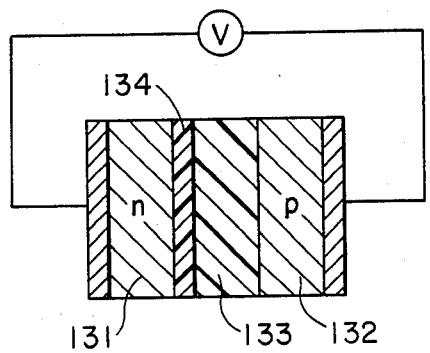
FIG. 13 is a schematic diagram of an alternative embodiment of the invention.

FIG. 13 is similar to FIG. 9. It shows an n-type semiconductor 131, a p-type semiconductor 132, a dry solid polymer electrolyte 133, and a high conductive layer 134. The layer 134 increases the interfacial contact area and between the semiconductor 131 and the adjacent electrolyte 133, and also produces an improved charge transfer characteristic at this interface and of the whole device. The highly conductive layer 134 is a polymer blend of a highly conductive polymer, e.g. polypyrrole and a solid polymer electrolyte, e.g. polyethylene oxide complexed with potassium iodide. In the blend 134, the polymer electrolyte component penetrates into the conductive polymer component 133 resulting in increased contact area, and thus better charge transfer across the interface. The film 133 is for example, several hundred to 10,000 angstroms thick; and layer 134 is 100 to 1000 angstroms thick. Both layers are essentially transparent.

The polymer blend 134 is synthesized directly on the surface of the semiconductor 131 by a technique of photoassisted electrochemical oxidation from a solution of the monomer of the highly conductive polymer and the polymer electrolyte in its complexed form. The resulting polymerization of the highly conductive polymer, e.g. with the complexed polymer electrolyte present in solution produces a polymer blend of the two polymer phases A method of manufacturing the basic cell is as follows, with the improved blend. The semiconductor 131 may be coated with a thin layer of platinum, e.g. 5–50 angstroms. This is particularly desirable where the n silicon is single crystal. The platinum layer may be provided e.g. by vacuum evaporation, or electrolytic deposition. The platinum layer produces a better electronic and physical coupling between the semiconductor and the polymer and thus leads to better charge transfer. If the semiconductor layer 131 is amorphous or polycrystalline silicon, then the platinum may also be used. The semiconductor may be any of those listed previously in the specification, for example CdSe, CdTe, and CdS. If the layer 131 is p-type silicon, a low electronegativity metal may be used, e.g. indium or aluminum.

A solution is formed containing (i) acetonitrile as solvent, (ii) $Et_4NBF_4$ (tetraethylammonium tetrafluoroborate), (.e.g 0.01–1.0 Molar), (iii) Pyrrole (0.01–5.0 Molar), (iv) 0.01–3.0% PEO by weight; molecular weight of PEO may be $10^4$–$5 \times 10^6$; (v) KI in a ratio of 4.5–8 polyether oxygen atoms per potassium atom, and (vi) $I_2$ in a ratio of $KI:I_2 = 4:1$. The substrate 131, with or without the platinum layer, is immersed into the solution and the semiconductor is held at 0.5 volts or higher potential, versus the standard calomel reference electrode.

The member 132 in FIG. 13 of the completed cell may be another p-type semiconductor, or a counter electrode comprising glass with a transparent conductive coating, e.g. indium tin-oxide (ITO), or platinum, or chromium, or other material as mentioned previously. The counter electrode may be coated, especially when it is ITO, with a thin layer of platinum, e.g. 5 to 50 angstroms for better charge transfer to the solid polymer electrolyte. When ITO is the counter electrode, the platinum is needed because ITO is an insert electrode with the iodine redox couple.

The element 132, whether a counter electrode on a glass support, or a semiconductor, or a web filled with charge carriers, (1) may be coated with platinum or chromium or other metal layer; or (2) may have a blend of polymer of a type described herein in place of such metal layer; or (3) may in addition to the platinum or other metal layer, have a layer of polymer blend on top.

Once the semiconductor layer 131 has been formed with the polymer blend, and the right hand member 132, prepared (whether bare, or with a layer of metal and/or a layer of polymer blend on the face thereof); the next step is to form the dry solid polymer electrolyte 133. A film of polyethylene oxide complexed with, (or doped with), potassium iodide and iodine is solution cast by solvent evaporation from acetonitrile solution, for example, by spin coating. The thickness when dry is in the range of 0.01 to 1.0 microns. The polymer electrolyte may be formed on the polymer blend film 134, or on the surface (bare or prepared) of elements 132 or on both. The two halves of the cell 131—134 and 132 are then contacted to each other by heating to 70°–100° C. under vacuum with pressure about 1 kg/cm² for ten minutes to ten hours.

Thus, it will be appreciated that the dry solid polymer electrolyte 133 is adjacent to the polymer blend 134 (which is a composite of dry solid polymer electrolyte with the highly conductive polymer). During the step of forming the polymer blend 134, there was an electrochemical polymerization of polypyrrole in a solution containing $PEO-KI/I_2$. Polyethylene oxide is a polymer soluble in acetonitrile. As the polypyrrole film grows, it entraps the $PEO-KI/I_2$ phase within it, resulting in a polymer blend of polypyrrole and $PEI-KI/I_2$.

A modification of the method just described may be achieved by using a different complexing salt for PEO. The reason is to avoid two competing paths for the current to flow:

(i) polymerization of pyrrole (2.2–2.4 electrons per pyrrole monomer).

(ii) oxidation of the iodide in the electrolyte solution, i.e. $2h^+ + 3I^- \rightarrow I_3$ at the semiconductor surface $2e^-$ $+I_3^- \rightarrow 3I^-$ at the counter electrode, where $h^+$ designates a hole and $e^-$ designates an electron.

Reaction (ii) is a parasitic reaction which lowers the yield of the polymerization. This may be improved as follows:

(a) Polymerize from a solution of what has been previously described plus PEO complexed with $KNO_3$, (alternatives are $NaNO_3$, KCl, NaCl, $KClO_4$, $NaClO_4$, $NaBF_4$, $KBF_4$). $NO^-_3$ and the other anions are not electroactive at the potentials in question and should not therefore contribute a parasitic current.

Figure 14:
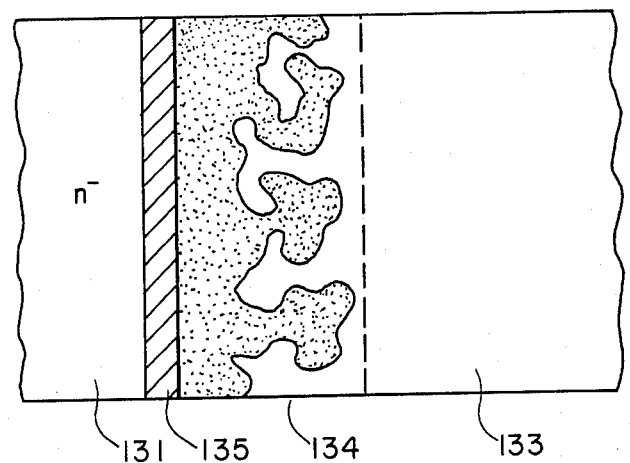
FIG. 14 is a highly schematic detailed cross-sectional view of the region of the polymer blend of FIG. 12.

(b) Upon contacting the polymer blend of polypyrrole and PEO with a film of $PEO-KI/I_2$ an electrochemical exchange of anions will automatically take place giving a polymer blend of polypyrrole and PEO $KI/I_2$, i.e. the $NO_3$ will diffuse out of the blend and the iodide will diffuse in. FIG. 14 is an enlarged highly schematic view of the cross-section showing the blend. This is an artistic representation of what is believed the blend looks like, with long strands of polypyrrole extending outward from the platinum layer 135. Like elements in both figures bear like legends.

Various alternatives may be used, some of which are indicated above in the specification. An alternative material for the dopant is NaI for KI; alternative materials for the highly conductive polymer include polyindole, polyazulene, polythiophene and polyfuran; and for the solid polymer electrolyte, polypropylene oxide for PEO.

An electric battery cell can also be constructed in which polyacetylene suitably doped is used in place of the semiconductor 131 and 132. Doping for example is with sodium and iodide ions. A Polyethyleneoxide solid electrolyte is used, and the polymer blend at one or both faces of the PEO is polyacetylene-polyethylene oxide. An alternative cell is with doped polyparaphenylene as elements 131 and 132, doped PEO as polymer electrolyte and a blend of polyparaphenlene and polyethylene oxide formed at the interfaces between the polyparaphenylene and polyethylene oxide.

Thus, there has been described an improved cell having increase in interfacial contact area and improve charge transfer characteristics due to the polymer blend between the solid polymer electrolyte electrodes, and the adjacent counter electrode and or semiconductors.

I claim:

1. A rechargeable battery cell comprising a first electrode; a polymer blend of a highly conductive polymer and a solid polymer electrolyte adjacent said first electrode; a dry solid polymer electrolyte adjacent said polymer blend; and a second electrode adjacent to said dry solid polymer electrolyte.

2. A cell according to claim 1, wherein said second electrode comprises a second layer of polymer blend of a highly conductive polymer and a solid polymer electrolyte, and a metal electrode.

3. A cell according to claim 2, wherein said polymer blend comprises a highly conductive polymer selected from the group comprising polypyrrole, polyindole, polyazulene, polythiophene, polyfuran, polyacetylene, and polyparaphenylene.

4. A cell according to claim 3, wherein said dry solid polymer electrolyte comprises polyethylene oxide or polypropylene oxide complexed with NaI, KI or LiI.

5. A cell according to claim 2, wherein said dry solid polymer electrolyte comprises polyethylene oxide or polypropylene oxide complexed with NaI, KI or LiI.

6. A cell according to claim 1, wherein said polymer blend comprises a highly conductive polymer selected from the group comprising polypyrrole, polyindole, polyazulene, polythiophene, polyfuran, polyacetylene and polyparaphenylene.

7. A cell according to claim 1, wherein said dry solid polymer electrolyte comprises polyethylene oxide or polypropylene oxide complexed with NaI, KI or LiI.

* * * * *